United States Patent
Chen

(10) Patent No.: US 10,224,531 B2
(45) Date of Patent: Mar. 5, 2019

(54) SWITCHING DEVICE FOR A BATTERY, AND BATTERY COMPRISING SAID SWITCHING DEVICE

(71) Applicant: Robert Bosch GmbH, Stuttgart (DE)

(72) Inventor: Chen Chen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 15/119,164

(22) PCT Filed: Jan. 30, 2015

(86) PCT No.: PCT/EP2015/051923
§ 371 (c)(1),
(2) Date: Aug. 16, 2016

(87) PCT Pub. No.: WO2015/124407
PCT Pub. Date: Aug. 27, 2015

(65) Prior Publication Data
US 2017/0012273 A1    Jan. 12, 2017

(30) Foreign Application Priority Data

Feb. 18, 2014 (DE) .................. 10 2014 202 932

(51) Int. Cl.
*H01M 2/34* (2006.01)
*B60L 3/00* (2019.01)
(Continued)

(52) U.S. Cl.
CPC ............ *H01M 2/34* (2013.01); *B60L 1/00* (2013.01); *B60L 3/00* (2013.01); *B60L 11/18* (2013.01);
(Continued)

(58) Field of Classification Search
None
See application file for complete search history.

(56) References Cited

U.S. PATENT DOCUMENTS

| 5,766,790 A * | 6/1998 | Kameishi ............. H01H 37/54 220/203.01 |
| 2008/0238370 A1* | 10/2008 | Carrier ............... H01M 2/1022 320/134 |

(Continued)

FOREIGN PATENT DOCUMENTS

| CN | 101192750 A | 6/2008 |
| CN | 102823026 A | 12/2012 |

(Continued)

OTHER PUBLICATIONS

International Search Report for Application No. PCT/EP2015/051923 dated Jun. 22, 2015 (English Translation, 4 pages).

*Primary Examiner* — Wyatt P McConnell
(74) *Attorney, Agent, or Firm* — Michael Best & Friedrich LLP

(57) ABSTRACT

The present invention relates to a switching device 1 for a battery 2, the switching device 1 being activated by an acoustic resonance effect to interrupt an electric line of the battery 2 to the outside. The present invention further relates to a battery 2 having an electrically activated power switch 21 for interruption of an electric line of the battery 2 to the outside and at least one such switching device 1, the power switch 21 and the switching device 1 being connected in series.

10 Claims, 3 Drawing Sheets

(51) Int. Cl.
  *B60L 11/18* (2006.01)
  *B60L 1/00* (2006.01)
  *B60R 16/033* (2006.01)
  *H01M 2/10* (2006.01)
  *H01M 10/48* (2006.01)

(52) U.S. Cl.
  CPC ......... *B60R 16/033* (2013.01); *H01M 2/1077* (2013.01); *H01M 10/48* (2013.01); *H01M 10/488* (2013.01); *H01M 2200/00* (2013.01); *H01M 2220/20* (2013.01)

(56) References Cited

U.S. PATENT DOCUMENTS

2012/0276423 A1* 11/2012 Asakura .............. H01M 10/441
  429/56
2013/0302654 A1* 11/2013 Schaefer ................ H01M 2/22
  429/50

FOREIGN PATENT DOCUMENTS

| | | |
|---|---|---|
| DE | 102010051669 | 5/2012 |
| DE | 102011013182 | 9/2012 |
| DE | 102011015829 | 10/2012 |
| GB | 484162 | 4/1938 |
| GB | 575731 | 3/1946 |
| WO | 2010004340 | 1/2010 |

\* cited by examiner

US 10,224,531 B2

SWITCHING DEVICE FOR A BATTERY, AND BATTERY COMPRISING SAID SWITCHING DEVICE

BACKGROUND OF THE INVENTION

Hybrid concepts or purely electrical drive concepts which are employed in road transport as purely electric vehicles or as hybrid vehicles, have increasingly been developed for some time in order to reduce the emissions by motor vehicles which are driven by internal combustion engines. The operation of electrical machines which are required for this purpose in motor and generator mode requires a corresponding electrical energy store in the respective vehicle, wherein, specifically in the case of electrically driven vehicles, voltages of several hundred volts are often required and a battery which is used as the energy store has to provide powers of up to several hundred kilowatts in the process. Examples of batteries of this kind include, inter alia, combinations of individual rechargeable battery cells, called a traction battery, which, for reasons of a high degree of efficiency and a high storage capacity, have high voltage potentials which could constitute a hazardous source of danger to vehicle occupants and also to rescue service personnel in the event of an accident, also called a crash, for example on account of the danger of a fire, explosion or the like caused by said voltage potentials.

In order to firstly ensure the required operational reliability by maintaining the permissible voltage ranges of the rechargeable battery cells and secondly to provide safety in the event of an accident, so-called battery management systems are usually used. Said battery management systems are used, amongst other things, to prevent an uncontrolled short circuit of individual battery cells or of the entire battery, said short circuit potentially leading to the battery catching fire or exploding. Therefore, some of the known battery management systems are, amongst other things, also safety devices for reducing the danger to persons in the event of an accident with an entirely or partially electrically operated vehicle, which safety devices are designed in such a way that the connection of the main battery to the corresponding electronic loads can be interrupted in the event of an accident.

As an example of safety devices of this kind for avoiding high dangerous voltage potentials acting on individuals in the event of a crash, DE 10 2011 013 182 A1 describes a device on traction batteries for electric vehicles in which different disconnection devices are provided, said disconnection devices disconnecting the battery cells from one another and from the on-board electrical system of the vehicle in accordance with predetermined criteria. In this case, the disconnection devices are safety switches which can be manually operated and which comprise, amongst other things, a manual emergency switch and also a switching element for triggering the cell group disconnection process, which switching element can be activated by radio from the outside. In DE 10 2011 013 182 A1, the safety switches are designed as conventionally powered switching relays or electronic circuit breakers which require a current source in order to be operated.

A schematic illustration of an operating principle of an electronic circuit breaker of this kind can be found in FIG. 5 in which the circuit breaker 91 which can be electrically operated can disconnect an electrical connection between a battery 92 and a power receiver 93, for example an electric motor of an electric vehicle or of a hybrid vehicle. The electrical signals which are required for this purpose and by means of which the circuit breaker 91 can be controlled in order to interrupt the electrical connection may however no longer be trouble-free or no longer be provided at all as a result of an accident-related failure of the vehicle-internal conventional 12 V battery. Therefore, an interruption between the battery 92 and the power receiver 93 cannot always be reliably ensured. An electric vehicle or hybrid vehicle which is damaged by an accident and has a closed power connection between the battery and current collectors can however put first responders, rescue service personnel and the occupants themselves in great danger.

SUMMARY OF THE INVENTION

In order to solve the abovementioned problems of the known prior art, the present invention provides a switching device for a battery, preferably for a rechargeable battery of an electric vehicle or of a hybrid vehicle, wherein the switching device can be operated by an acoustic resonance effect in order to interrupt an electrical line of the battery to the outside, that is to say an electrical connection between the battery and a current collector, such as an electric motor for example. An important aspect of the invention is therefore that, as an alternative or in addition to the usual circuit breaker which can be electrically operated, a further switching device is provided, which switching device can be operated by a contactless signal and does not draw any current from a vehicle battery, such as a 12 V vehicle battery which is provided as standard for example. As a result, the supply of power in an electric vehicle or a hybrid vehicle can be reliably interrupted. The term "acoustic resonance effect" in this connection means an effect or an action on the switching device according to the invention due to sound-related resonance, that is to say due to a resonance peak of the natural frequency of the switching device which is triggered by at least one excitation by means of targeted sound waves. The resonance tripping signal which is produced by the targeted sound waves, also called directed specific resonance frequency signal, preferably has a predetermined directional characteristic, wherein the sound wave signal comprises a thin, powerful directed beam of sound or bundle of sound and can be used in order to be directed at small targets. These targets can be excited by the directed acoustic signal to oscillate in a resonant manner, wherein destruction of the target can be achieved due to the peak by means of resonance. The switching device according to the invention therefore constitutes a kind of emergency switch, also called emergency off switch.

In order to operate the switching device according to the invention by a resonance effect of this kind, said switching device preferably has at least one container which is prestressed by a spring element and which can be destroyed by acoustic resonance, in other words by acoustic excitation of the resonant frequency thereof. The spring element, preferably a helical spring, a plate spring or the like, is prestressed by the container being arranged so as to bear against the spring under pressure, as a result of which the spring energy is stored in the spring element. After destruction of the container due to acoustic resonance, the spring element can expand, as a result of which the switching device is opened, for example by an element which supports the container, that is to say a supporting element such as, for example, a plate which serves as a contact plate as part of the power line, being lifted away from the power line by the spring element and accordingly interrupting the power line. In this case, the supporting element is preferably moved away from the power line, so that high currents of, for example, 1000 amperes or more at approximately 450 volts can also be interrupted. The container, which acts as part of the switching device according to the invention, is preferably a hollow body which is composed of a fragile material. As a result, the container can be reliably destroyed by the acoustic resonance effect. In this case, a fragile material of this kind can be a ceramic material, such as kaolinite or the like for example, or a glass material, such as soda lime glass or the like for example. In order to reliably destroy the container, the correct resonant frequency of the container preferably has to be achieved, the signal has to have the necessary acoustic intensity or acoustic power, and the target, that is to say the container, has to be struck as exactly as possible by the thin beam of sound in order to excite the resonance peak of the container as strongly as possible. To this end, the material of the container has to be carefully selected and matched to the acoustic signal, so that the resonance effect cannot occur in the normal driving state of the vehicle. Furthermore, the resonant frequency likewise has to be carefully selected, so that it is not possible for the tripping acoustic signal to overlap with other wireless applications or else other wireless applications to trigger the resonance effect in the container. In order to prevent sabotage of the vehicle or the battery of the vehicle, the resonant frequency of the container has to be kept secret from everyone involved.

In order to further be able, amongst other things, to prevent possible arcs, also called arc discharge, between the raised supporting element and the power line, the container of the switching device according to the invention can contain an inert gas, such as an environmentally friendly quenching gas which preferably contains carbon dioxide, argon or nitrogen for example. By virtue of the inert gas being released when the container is destroyed, any arc which may build up between the supporting element and the power line can be quickly quenched or canceled out, as a result of which the power line can be reliably interrupted starting from when the container is destroyed.

According to a further aspect of the invention, a battery comprising an electrically operable circuit breaker for interrupting an electrical line of the battery to the outside, and comprising at least one switching device as described above is provided, wherein the circuit breaker and the switching device are connected in series, that is to say are arranged one behind the other in the power line, so that the switching device can interrupt the power line if the circuit breaker which can be electrically operated is no longer in a position to do so. In order to allow first responders or rescue service personnel to identify a switching state of the switching device according to the invention in the battery at the site of the accident in the event of the vehicle being involved in an accident, the switching device is arranged in a housing of the battery such that it is visible from the outside, preferably in a viewing window which is provided in the housing and through which the state of the container, that is to say the intact or destroyed state of the container, and therefore the switching state of the switching device can be identified from outside the battery and accordingly a potential for danger due to the battery can be estimated. In order to destroy the container of the switching device according to the invention by virtue of the action of sound, a signal transmitter for outputting an acoustic signal can be provided in or on the battery, such as a diaphragm transmitter or the like for example. As an alternative to this, a signal transmitter of this kind can also be provided outside the battery, for example as a provided auxiliary tool of the rescue service personnel, as long as an output acoustic signal can reach as far as the switching device with a sufficient intensity. However, the spectrum of the resonant signal has to be limited in each case, so that the effective range between the emergency switch, which is formed by the switching device, and the acoustic signal transmitter is given by the output power of the signal transmitter, for example at 0.5 meter or less. The signal transmitter can further preferably have a dedicated power source, such as a battery which is provided specifically for it for example, in order to ensure functioning of the signal transmitter.

In order to detect, amongst other things, the presence of gas in the vicinity of the switching device, the battery can further have a gas sensor which can establish, for example, that the inert gas is escaping from the container, that is to say the container is damaged or destroyed. As a result, slight damage to the container which does not necessarily operate the switching device but allows gas to escape from the container can substantially be identified and the need for servicing or the like of the switching device, for example by replacing the switching device or at least the container of the switching device, can be indicated to the outside.

Finally, the battery according to the invention can substantially be composed of an interconnected arrangement of a large number of rechargeable battery cells, preferably of an interconnected arrangement or a combination of lithium-ion cells which, as is known, can be used as an energy source in an electric vehicle or a hybrid vehicle.

The switching device according to the invention provides, for a battery of an electric vehicle or of a hybrid vehicle, an additional interrupter switch, in addition to a circuit breaker which is usually already provided and can be electrically operated, for interrupting a power line between a battery and a current collector of the vehicle. However, said additional emergency switch does not use the 12 V battery of the vehicle which is at risk of failure in the event of an accident, but rather operates independently of the vehicle current or independently of the 12 V battery of the vehicle. As a result, interruption of the power line in the event of an accident can be ensured if the circuit breaker which can be electrically operated fails, so that first responders, rescue service personnel or else the occupants themselves are protected against electric shocks due to damage to the power line between the battery and the current collector.

DETAILED DESCRIPTION

Figure 1:
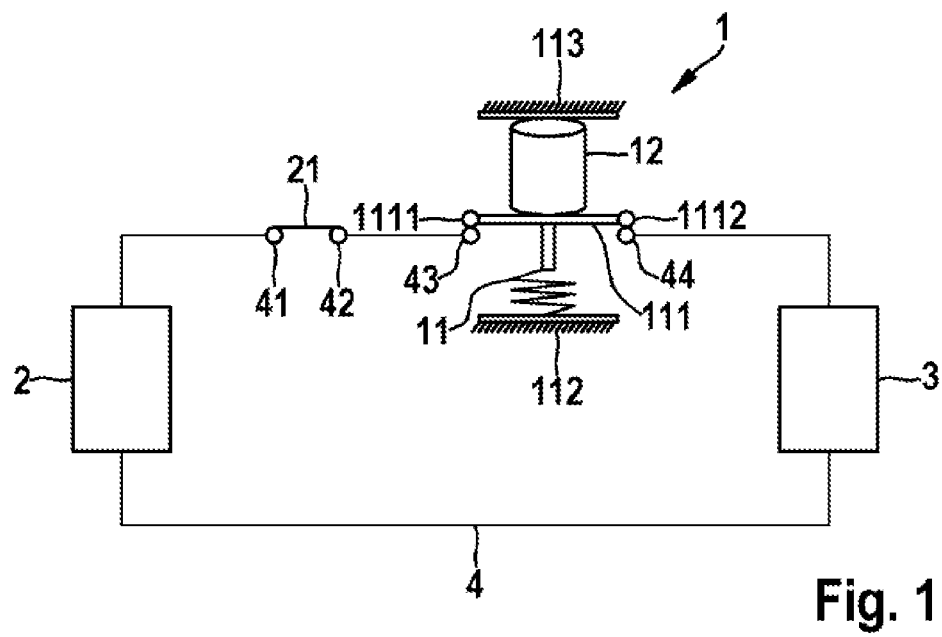
FIG. 1 shows a schematic illustration of an electrical circuit of an electric vehicle comprising a switching device according to a preferred embodiment of the invention in the closed state.
Figure 2:
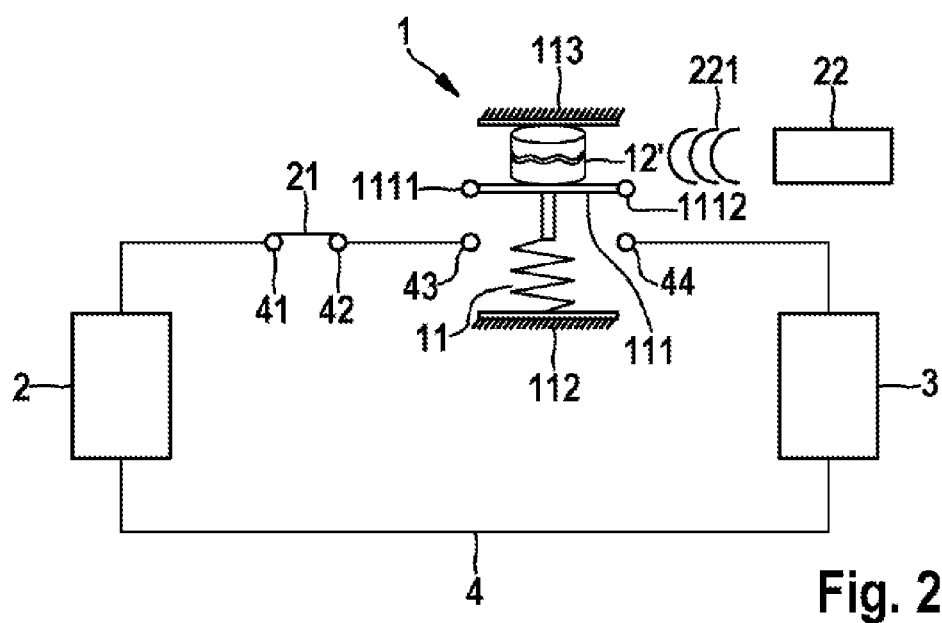
FIG. 2 shows a schematic illustration of the electric vehicle electrical circuit shown in FIG. 1 comprising the switching device according to the preferred embodiment of the invention in the open state.
Figure 5:
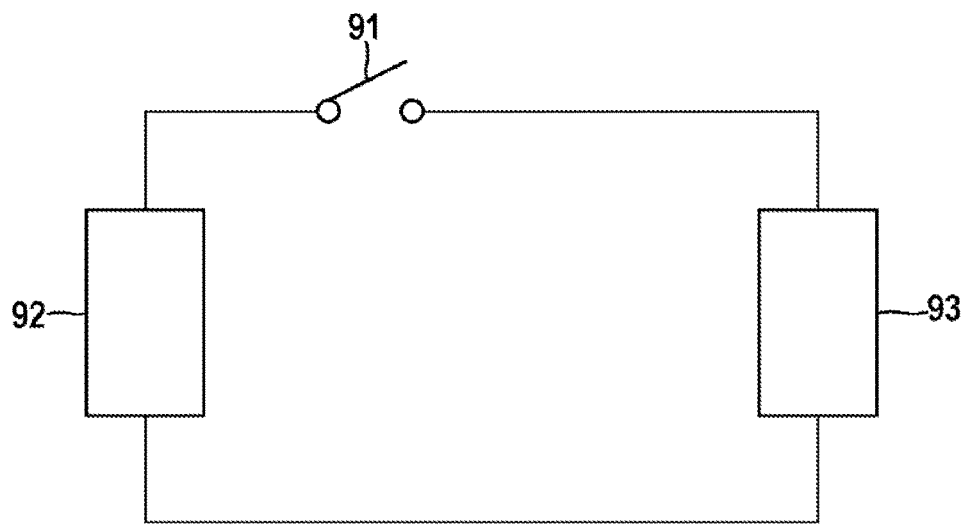
FIG. 5 shows a schematic illustration of an electrical circuit of an electric vehicle according to the prior art.

FIGS. 1 and 2 show a preferred embodiment of the switching device 1 according to the invention which, based on the prior art shown in FIG. 5, is arranged in a power line 4 between a battery 2 and an electric motor 3, which acts as a power collector, of an electric vehicle or hybrid vehicle connected in series with a circuit breaker 21 which can be electrically operated. Although the circuit breaker 21 is illustrated as being situated outside the battery 2 in FIGS. 1 and 2, it is preferably an integral constituent part of the battery 2. The circuit breaker 21 is supplied with power by a 12 V battery (not shown) of the vehicle. The switching device 1, which is shown in a closed state in FIG. 1, in which the power line 4 between the battery 2 and the electric motor 3 is closed, is similar to the circuit breaker 21 as is illustrated as being situated outside the battery 2, but is likewise preferably an integral constituent part of the battery 2. In the closed state, the circuit breaker 21 closes a contact between the contact points 41 and 42 of the power line 4. The switching device 1 is independent of the 12 V battery (not shown) of the vehicle. The switching device 1 according to the preferred embodiment substantially comprises a spring element 11, in the form of a helical spring in the preferred embodiment, which is integrally connected to a supporting element on one side and is fastened, for example, to a stationary component 112 on the other side. In the preferred embodiment in the form of a plate 111 with a spring projection, the supporting element supports or holds a container 12 which is held firmly against its side which is situated opposite the plate 111, for example by a contact area 113. The plate 111 has contact points 1111 and 1112, wherein the contact point 1111 is in contact with a contact point 43 of the power line 4 in the closed state of the switching device 1, and the contact point 1112 is in contact with a contact point 44 of the power line 4 in the closed state of the switching device 1. The container 12 is clamped between the plate 111 and the contact area 113, wherein the spring element 11 prestresses the plate 111 against the container 12. In the preferred embodiment of the switching device 1 according to the invention, the container 12 is composed of a hollow glass container which is filled with an inert quenching gas. Under normal conditions, that is to say during normal operation of the vehicle, no resonance excitation frequencies occur and the container 12 should remain intact. The switching device 1, which constitutes an emergency switch, therefore remains in an equilibrium state in which the container 12 maintains its outer shape. In this case, the length of the container 12 is dimensioned such that the plate 111, by way of its contact points 1111, 1112, remains in close contact with the associated contact points 43, 44 of the power line 4. The spring element 11 is in a compressed state in which it cannot however lift the plate 111 away from the contact points 43, 44 since the container 12 is intact.

In addition to the components which are shown in FIG. 1, FIG. 2 shows a signal transmitter 22 which is illustrated outside the battery 2 in the figure. The signal transmitter 22 is able, for example in the event of the vehicle being involved in an accident, to output an acoustic signal 221, either automatically or in response to a command which can be provided by the occupants or the first responders or rescue service personnel at the site of the accident. The acoustic signal 221, which serves to reliably destroy the container 12, has to be selected such that it achieves the resonant frequency of the glass container 12, has the necessary acoustic intensity or acoustic power and is oriented precisely to the container 12. If these requirements are met, the container 12 is excited to oscillate in a resonant manner, said oscillation destroying the outer wall of the container 12, that is to say breaking the glass wall of the container 12, and the inert quenching gas which is located in the interior of the container 12 escapes, as is shown in FIG. 2 amongst other things. As a result of the container 12 breaking, illustrated by the broken container 12' in FIG. 2, the plate 111 can now be lifted away from its bearing points by the spring 11, as a result of which the switching device 1 is opened and therefore interrupts the power line 4. In this way, the power line 4 is interrupted even when the circuit breaker 21 remains closed, as is shown in FIG. 2. Accordingly, in other words, resonance excitation is generated by the signal transmitter 22 in the event of an emergency, said resonance excitation not being triggered automatically but rather manually by occupants, rescue service personnel or first responders. As a result, the switching device 1 is no longer in its equilibrium state since the container 12 is made to oscillate in a resonant manner by the resonance excitation, which is generated by the signal transmitter 22, at a specific acoustic resonant frequency and a specific acoustic power, therefore breaks and consequently is no longer intact. As a result, the spring 11 is able to expand, as a result of which the plate 111, by way of its contact points 1111, 1112, is lifted away from the power line 4 or from the contact points 43, 44 and consequently interrupts the power line 4.

Figure 3:
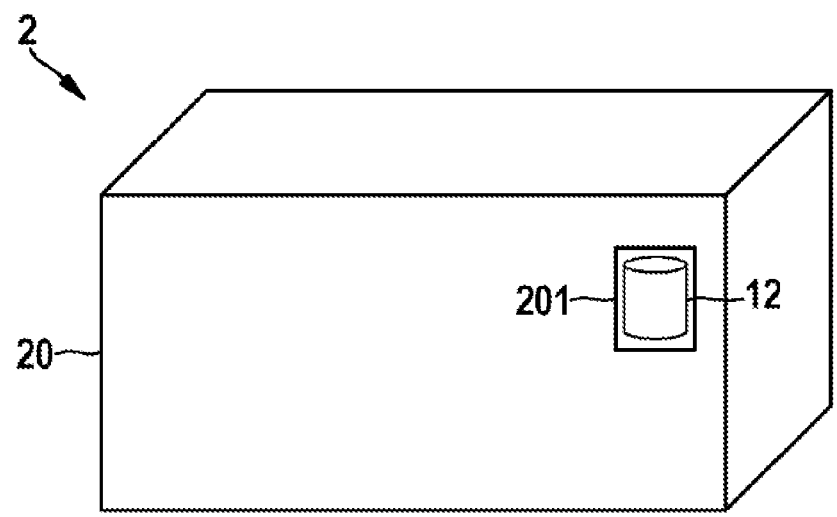
FIG. 3 shows a battery with a viewing window for a container of the switching device shown in FIGS. 1 and 2 in the closed state.
Figure 4:
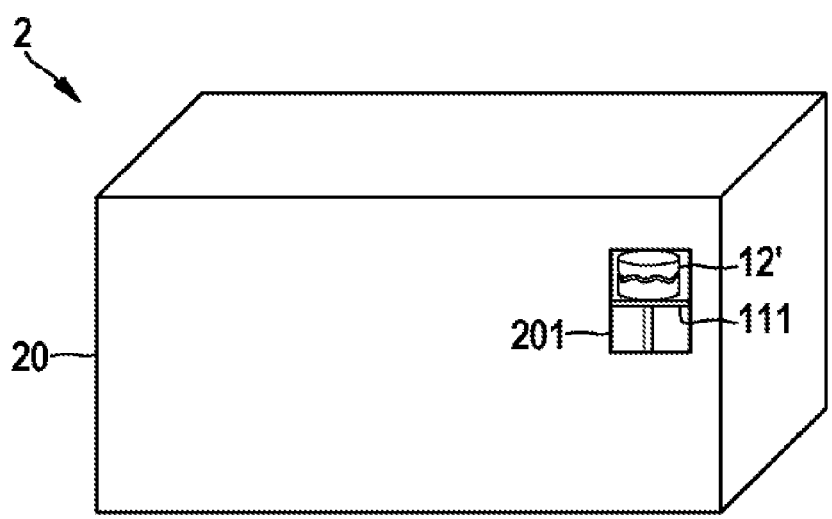
FIG. 4 shows the battery shown in FIG. 3 with the viewing window for the container of the switching device shown in FIGS. 1 and 2 in the open state.

FIGS. 3 and 4 show a battery 2 according to the preferred embodiment of the invention. In this case, the battery 2 has a housing 20 which acts as a battery housing and has a viewing window 201 which is provided in said housing for visually monitoring whether the container 12 is intact, it being possible to at least partially see the switching device 1 in said viewing window. In this case, FIG. 3 shows the battery 2 in a normal, intact state, that is to say in a normal state of the vehicle before an accident, wherein the switching device 1 is in a closed state. It is possible to identify this on account of the intact container 12 being visible in the viewing window 201. As a result, it can be assumed that the contact points 1111, 1112 of the plate 111 are in close contact with the contact points 43, 44 of the power line 4, as a result of which the power line 4 is not interrupted. Therefore, the view illustrated in FIG. 3 is the picture of what a viewer sees when viewing the battery 2 when the switching device 1 is in the non-tripped state. If the switching device 1 is now tripped, in order for example to protect the viewer against electric shocks in the event of an accident, the corresponding signal transmitter 22 can target the viewing window 201 and accordingly precisely the container 12 and said container can be destroyed by a signal output in the form of a sound wave or a sound wave signal, without having to touch the battery 2.

In contrast, the view illustrated in FIG. 4 is a picture of what the viewer sees when viewing the battery 2 in a tripped, open state of the switching device 1, for example after the signal transmitter 22 directs an acoustic signal at the viewing window 201 in a targeted manner. In this case, it can be identified in the viewing window 201 that the container 12', after resonance excitation of said container, is not still intact, but rather is destroyed, and that the plate 111 is lifted upward, as a result of which the contact points 1111, 1112 of the plate 111 are lifted away from the contact points 43, 44 of the power line 4 and consequently the power line 4 is interrupted. The viewer can accordingly assume that the battery 2 no longer presents a further risk to him due to an electric shock or the like.

Traction batteries for electric vehicles or hybrid vehicles are possible preferred fields of use for the present invention. Other fields of use of the switching device 1 according to the invention are likewise feasible however, for example in battery applications in which a user is intended to be able to manually interrupt a current flow in the battery.

The invention claimed is:

1. A switching device (1) for a battery (2), wherein the switching device (1) is configured to be operated by an acoustic resonance effect in order to interrupt an electrical line of the battery (2) to a device located outside of the battery, wherein the switching device (1) has at least one container (12) which is prestressed by a spring element (11) and is configured to be destroyed by acoustic resonance.

2. The switching device (1) as claimed in claim 1, wherein the container (12) is a hollow body which is composed of a fragile material.

3. The switching device (1) as claimed in claim 1, wherein the container (12) is composed of a ceramic material or a glass material.

4. The switching device (1) as claimed in claim 1, wherein the container (12) contains an inert gas.

5. The switching device (1) as claimed in claim 4, wherein the inert gas is a quenching gas.

6. A battery (2) comprising:
a circuit breaker (21) configured to be electrically operated, for interrupting an electrical line to a device outside of the battery, and
at least one switching device (1) configured to be operated by an acoustic resonance effect, wherein the circuit breaker (21) and the switching device (1) are connected in series, and wherein the switching device includes a container prestressed by a spring element, the container configured to release a gas in response to being destroyed by the acoustic resonance effect.

7. The battery (2) as claimed in claim 6, wherein the switching device (1) is arranged in a housing (20) of the battery (2) such that the switching device (1) is visible from outside of the battery.

8. The battery (2) as claimed in claim 6, wherein the battery (2) further has a signal transmitter (22) for outputting an acoustic signal.

9. The battery (2) as claimed in claim 6, wherein the battery (2) further has a gas sensor configured to detect a gas released by the at least one switching device.

10. The battery (2) as claimed in claim 6, wherein the battery (2) has an interconnected arrangement of a plurality of rechargeable battery cells.

* * * * *